United States Patent
Sato et al.

(10) Patent No.: US 8,524,830 B2
(45) Date of Patent: Sep. 3, 2013

(54) RESIN COMPOSITION AND RESIN MOLDED PRODUCT

(75) Inventors: Noritaka Sato, Kanagawa (JP); Tsutomu Noguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 513 days.

(21) Appl. No.: 12/571,625

(22) Filed: Oct. 1, 2009

(65) Prior Publication Data
US 2010/0081766 A1 Apr. 1, 2010

(30) Foreign Application Priority Data
Oct. 1, 2008 (JP) ................. 2008-256741

(51) Int. Cl.
C08G 63/91 (2006.01)
C08K 5/15 (2006.01)
C08K 5/20 (2006.01)

(52) U.S. Cl.
USPC ........... 525/54.1; 524/109; 524/229; 524/214

(58) Field of Classification Search
USPC .............. 525/54.1, 450, 66, 425, 426; 524/9, 524/229, 214, 599, 240; 523/105, 111, 113; 564/152, 155, 180
See application file for complete search history.

(56) References Cited

U.S. PATENT DOCUMENTS

| | | | |
|---|---|---|---|
| 5,516,565 A | 5/1996 | Matsumoto | |
| 6,235,823 B1* | 5/2001 | Ikeda et al. | 524/229 |
| 6,245,843 B1* | 6/2001 | Kobayashi et al. | 524/109 |
| 2002/0002252 A1 | 1/2002 | Obuchi et al. | |
| 2004/0214983 A1 | 10/2004 | Tobita et al. | |
| 2006/0124383 A1* | 6/2006 | Yamada et al. | 181/200 |
| 2006/0247340 A1 | 11/2006 | Sato et al. | |

FOREIGN PATENT DOCUMENTS

| | | |
|---|---|---|
| JP | 09-278991 | 10/1997 |
| JP | 10-158369 | 6/1998 |
| JP | 11-005849 | 1/1999 |
| JP | 11-116783 | 4/1999 |
| JP | 2002-322294 | 11/2002 |
| JP | 2004-352872 | 12/2004 |
| JP | 2004-352873 | 12/2004 |
| JP | 2006-282940 | 4/2005 |
| JP | 2008-007593 | 6/2006 |
| JP | 2006-282940 | 10/2006 |
| JP | 2006-299091 | 11/2006 |
| JP | 2008-138051 | 6/2008 |

OTHER PUBLICATIONS

European Office Action issued on Jan. 25, 2010 for corresponding European Patent Application 09011514.
Japanese Office Action issued Jan. 25, 2011, corresponding to Japanese Appln. No. 2008-256741.

* cited by examiner

Primary Examiner — James J Seidleck
Assistant Examiner — S. Camilla Pourbohloul
(74) Attorney, Agent, or Firm — K&L Gates LLP

(57) ABSTRACT

A resin composition includes a polyester capable of forming a crystal structure, and a substance represented by the following general structural formula (1), the substance represented by the following general structural formula (1) has a dehydration-condensed structure of two molecules of natural product-derived α-amino acids or a substitution structure thereof, and the two molecules of α-amino acids are not simultaneously glycine.

General Structural Formula (1)

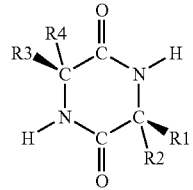

In the above general structural formula, R1, R2, R3, and R4 indicate groups or substituent groups thereof bonded to the α carbons of the α-amino acids.

10 Claims, No Drawings

RESIN COMPOSITION AND RESIN MOLDED PRODUCT

CROSS REFERENCES TO RELATED APPLICATIONS

The present application claims priority to Japanese Priority Patent Application JP 2008-256741 filed in the Japan Patent Office on Oct. 1, 2008, the entire content of which is hereby incorporated by reference.

BACKGROUND

The present application relates to a resin composition including a polyester capable of forming a crystal structure and a resin molded product obtained by molding the resin composition, and more particularly relates to a resin composition which has durability by promoting crystallization of a biodegradable resin.

In recent years, concomitant with an increase in environmental consciousness, the use of a resin material degradable under natural environmental conditions, that is, the use of a resin material having so-called biodegradable properties, has drawn attention.

Unlike publicly disclosed general-purpose resins, since a resin having biodegradable properties is manufactured by using, for example, a non-fossil fuel as a primary raw material, an adverse influence of shortage of raw materials caused by the depletion of resources is advantageously small. In addition, since being degraded in the natural environment, a resin having biodegradable properties advantageously serves to solve problems relating to waste treatment. Furthermore, a resin having biodegradable properties can be advantageously manufactured from natural resources such as corns. In addition, a resin having biodegradable properties can advantageously reduce the amount of $CO_2$ gas which is one of causes of the global warming; hence, hereinafter, the material described above is expected to draw more attention.

Among biodegradable resins, for example, an aliphatic polyester, in particular, a poly(lactic acid), has a high melting point (170 to 180° C.) and also has superior material properties capable of forming a transparent molded product, and hence it is expected that the above aliphatic polyester will have wide practical utility.

The biodegradable resin described above has been primarily used, for example, for materials for agriculture, forestry, and fisheries (films, planting pots, fishing lines, fishnets, and the like); civil engineering work materials (water retention sheets, nets for plants, and the like); package and container materials (hard to be recycled due to adhesion of soil, food, and the like), and disposal goods, such as convenience goods, sanitary goods, play goods. However, in view of environmental conservation, a further increase in use of the biodegradable resin has been studied.

A biodegradable resin has been studied to be used for electrical and electronic products, such as chassis of televisions and housings of personal computers, and in consideration of the application to chassis and structural materials of electrical products as described above, in general, it is believed that a biodegradable resin be requested to have heat resistance at approximately 80° C.

However, since a biodegradable polyester has inferior heat resistance, and for example, since a poly(lactic acid), which is one representative example thereof, has a glass transition temperature (Tg) of approximately 60° C., a molded product obtained therefrom is softened and deformed at a temperature more than the glass transition temperature; hence, there has been a problem of heat resistance in practical use.

In addition, the heat resistance necessary in a practical use indicates a rigidity (elastic modulus) of approximately 100 MPa at approximately 80° C.

In consideration of the problem described above, in order to maintain superior properties as a practical material, in recent years, it has been believed that improvement in heat resistance of a resin capable of forming a crystal structure is important.

In order to improve the heat resistance of a biodegradable polyester, for example, a method for adding a heat-resistant inorganic filler, such as talc or mica, has been commonly performed. By this method, the mechanical properties can be improved as well as improvement in heat resistance, and the hardness of the material can also be improved.

However, only by addition of an inorganic filler to a resin, it has been difficult to ensure practically sufficient heat resistance.

Accordingly, heretofore, the crystallization of a poly(lactic acid) was further promoted by performing a heat treatment during or after molding, so that the heat resistance was improved.

Although being a biodegradable polyester capable of forming a crystal structure, a poly(lactic acid) is a polymer which is difficult to be crystallized; hence, when the poly(lactic acid) is molded by a method similar to that for a general-purpose resin, a molded product becomes amorphous or tends to have a high amorphous ratio, so that the mechanical strength is degraded, and the heat distortion is liable to occur.

On the other hand, the crystallization of a material can be promoted by performing a heat treatment during or after molding, and as a result, the heat resistance of a molded product can be improved.

However, since a method for promoting the crystallization by a heat treatment takes a long period of time, the productivity is not superior, thereby causing a practical problem.

When a related general-purpose resin is used, an injection molding step is performed generally in a molding cycle of approximately 1 minute. However, in the case in which a poly(lactic acid) is used, in order to advance the crystallization thereof by performing a heat treatment on a molded product in a mold so as to obtain a practically sufficient mechanical strength, a considerably long time may be necessary as compared to the case in which a general-purpose resin is used.

In addition, in a step of crystallizing a biodegradable polyester, since the spontaneous generation frequency of crystal nuclei is very low, the size of crystals is only on the order of several microns, and white turbidity occurs in a finally obtained resin composition, so that the transparency thereof is degraded. Accordingly, the practical use range is disadvantageously limited.

In order to solve the various problems described above, there has been a method for promoting the crystallization of a biodegradable polyester by adding a nucleating agent to a biodegradable polyester capable of forming a crystal structure.

The nucleating agent described above is an agent which functions as primary crystal nuclei of a crystal polymer and which promotes crystal growth thereof; however, in a broad sense, a material promoting the crystallization of a crystal polymer, that is, a material increasing a crystallization rate itself of a polymer, may also be called a nucleating agent.

When a nucleating agent is added to a biodegradable polyester capable of forming a crystal structure, since an effect of particularizing crystals is obtained, the rigidity of a finally obtained resin composition is improved, and further, the transparency thereof is also improved. In addition, when a nucleating agent is added to a biodegradable polyester capable of forming a crystal structure, since the crystallization rate thereof during molding is improved, the time necessary for an injection molding step can be shortened.

An effect similar to that obtained when a nucleating agent is added to a biodegradable polyester capable of forming a crystal structure is also confirmed in a crystal resin other than a biodegradable polyester.

For example, in the case of polypropylene (hereinafter referred to as "PP" in some cases), by addition of a nucleating agent, improvement in rigidity and improvement in transparency are confirmed. As the nucleating agent used in this case, for example, a sorbitol-based material may be mentioned, and it is believed that a three-dimensional network thereof effectively works on the crystallization of PP. In addition, besides the sorbitol-based material, as a metal salt type material; for example, hydroxy-di(t-butyl benzoic acid)aluminum, bis(4-t-butylphenyl)sodium phosphate, and methylene-bis(2,4-di-t-butylphenyl)phosphate sodium salt may be mentioned.

However, a polyester such as a poly(lactic acid) is used as the resin, since it is not likely to be crystallized as described above, there is a practical problem of a nucleating agent to be used.

For example, when talc having a small nucleating effect is used as a nucleating agent, since a sufficient effect may only be obtained when the addition amount of talc is increased to approximately several tens of percent, the addition amount becomes excessively large. As a result, an obtained resin composition thereby is inferior in mechanical strength, and there has been a problem in that a practically necessary mechanical strength may not be obtained. In addition, when the content of talc is large in the resin, white turbidity occurs, and the transparency is degraded, so that the practical use range may be disadvantageously limited.

Accordingly, for example, in Japanese Unexamined Patent Application Publication No. 10-158369, a technique of a crystallization promoting method has been disclosed in which a sorbitol-based material is applied as a nucleating agent to an aliphatic polyester. In addition, Japanese Unexamined Patent Application Publication No. 10-158369 also has disclosed that by applying a sorbitol-based material as a nucleating agent to a poly(lactic acid), a crystallization effect is obtained.

As another crystallization promoting method by addition of a nucleating agent, for example, in Japanese Unexamined Patent Application Publication Nos. 9-278991 and 11-5849, a technique has been disclosed in which a transparent nucleating agent is applied to an aliphatic polyester. As this transparent nucleating agent, at least one selected from the group consisting of an aliphatic carboxylic acid amide, an aliphatic carboxylic acid salt, an aliphatic alcohol, and an aliphatic carboxylic acid ester and having a melting point of 40 to 300° C. may be used (see Japanese Unexamined Patent Application Publication No. 9-278991). In addition, as another transparent nucleating agent, at least one selected from the group consisting of organic compounds having a melting point or a softening point of 80 to 300° C. and a melting entropy of 10 to 100 cal/K/mol may be used (see Japanese Unexamined Patent Application Publication No. 11-5849).

In addition, in Japanese Unexamined Patent Application Publication No. 11-116783, a technique has also been disclosed in which a fatty acid ester having a specific structure is added as a transparentizing agent to a poly(lactic acid)-based resin.

Furthermore, in Japanese Unexamined Patent Application Publication No. 2004-352872, a technique has been disclosed in which a specific amide-based compound is blended particularly with a poly(lactic acid) to form a resin composition having superior heat resistance and impact strength. In addition, in Japanese Unexamined Patent Application Publication No. 2004-352873, a technique has been disclosed in which a specific heterocyclic compound is blended particularly with a poly(lactic acid) to form a resin composition having superior heat resistance and impact strength. In Japanese Unexamined Patent Application Publication Nos. 2004-352872 and 2004-352873, as the amide-based compound and the heterocyclic compound, phthalic acid hydrazide is described by way of example, and it has been disclosed that in one example in which phthalic acid hydrazide and talc are used in combination, the crystallinity of the poly(lactic acid) can be improved.

In Japanese Unexamined Patent Application Publication No. 2006-282940, a technique has been disclosed in which an amino acid and a polymer capable of forming a crystal structure, in particular, a poly(lactic acid), are contained to manufacture a transparent resin composition having superior rigidity, moldability, and heat resistance. In addition, in Japanese Unexamined Patent Application Publication No. 2006-299091, a technique has been disclosed in which a polymer capable of forming a crystal structure, in particular, a poly (lactic acid), and a material having a specific five-membered ring or six-membered ring are contained to form a transparent resin composition having superior rigidity, moldability, and heat resistance.

Incidentally, it has been believed important for an industrial product formed from polyesters to ensure practical resistance against hydrolysis.

The degree of hydrolysis changes depending on the type of polyester to be used and/or the use environment, and depending on the service period of a molded product, the problem relating to hydrolysis may not become a practical problem. However, when a biodegradable polyester is used, since the problem relating to hydrolysis may become a serious problem in practice, and hence hereinafter, it becomes important to ensure practical durability against hydrolysis.

That is, when the service period is short (short hours), rapid hydrolysis is preferable, and on the other hand, when the service period is long (long hours), the hydrolysis is preferably suppressed.

For example, when a biodegradable polyester is applied to chassis of electrical products, electronic apparatuses, and the like, it is requested to guarantee a long-term reliability for approximately several to ten years, and hence mechanical properties, such as a tensile strength, a flexural strength, and an impact resistance, have to be maintained at a practically sufficient level during the period described above.

As for a technique to improve the long-term reliability of a biodegradable polyester, heretofore, various proposals have been made; however, every proposed technique has failed to simultaneously satisfy improvement in resin crystallinity described above and sufficient material long-term reliability, and a technique capable of satisfying the above desires has not been proposed yet.

SUMMARY

Even when any of the nucleating agents disclosed in Japanese Unexamined Patent Application Publication Nos. 10-158369, 9-278991, 11-5849, and 11-116783 is used, a practically sufficient effect of promoting crystallization and a practically sufficient effect of improving durability of a molded product are not obtained, and hence the nucleating agents described above are not good enough.

In addition, according to Japanese Unexamined Patent Application Publication Nos. 2004-352872 and 2004-352873, when the crystallinity was evaluated by separately adding phthalic acid hydrazide to the poly(lactic acid), the improving effect was small as described later, and practically sufficient heat resistance and impact strength could not be obtained.

Furthermore, according to Japanese Unexamined Patent Application Publication Nos. 2006-282940 and 2006-299091, although the crystallinity of the poly(lactic acid) is improved to a certain extent, the improvement in crystallinity is further desired.

Hence, in consideration of the actual situation of the related techniques described above, according an embodiment, it is desirable to provide a resin composition which promotes the crystallization of a polyester capable of forming a crystal structure and improves a mechanical strength thereof and which has durability in accordance with necessary service period.

In addition, according to an embodiment, it is desirable to provide a resin molded product formed using the above resin composition.

Through intensive research carried out by the inventors of the present application, it was found that the problems described above can be solved when a substance represented by a specific general structural formula is blended with a polyester capable of forming a crystal structure, and hence, the present application was made.

A resin composition according to an embodiment includes: a polyester capable of forming a crystal structure; and a substance represented by the following general structural formula (1), and the substance represented by the following general structural formula (1) has a dehydration-condensed structure of two molecules of natural product-derived α-amino acids or a substitution structure thereof. However, in the above resin composition, the two molecules of α-amino acids are not simultaneously glycine.

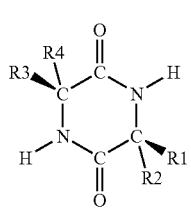

General Structural Formula (1)

In the above general structural formula (1), R1, R2, R3, and R4 indicate groups or substituent groups thereof bonded to the α carbons of the α-amino acids.

In the resin composition described above, the amino acids are preferably at least one selected from phenylalanine and valine.

In addition, the polyester is preferably a poly(lactic acid).

Furthermore, the above resin composition preferably further includes a hydrolysis suppressor for the poly(lactic acid).

In addition, a resin molded product according to an embodiment is formed using a resin composition that includes a polyester capable of forming a crystal structure; and a substance represented by the following general structural formula (1), and the substance represented by the following general structural formula (1) has a dehydration-condensed structure of two molecules of natural product-derived α-amino acids or a substitution structure thereof. However, in the above resin molded product, the two molecules of α-amino acid molecules are not simultaneously glycine.

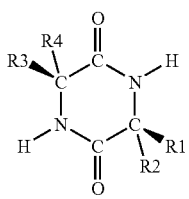

General Structural Formula (1)

In the above general structural formula (1), R1, R2, R3, and R4 indicate groups or substituent groups thereof bonded to the a carbons of the α-amino acids.

The resin composition according to an embodiment has superior rigidity, moldability, heat resistance, and durability.

In addition, the resin molded product according to an embodiment is manufactured using the above resin composition and has superior rigidity, heat resistance, and durability.

Additional features and advantages are described herein, and will be apparent from the following Detailed Description and the figures.

DETAILED DESCRIPTION

A resin composition according to an embodiment and a resin molded product formed using the resin composition will be described in detail.

The resin composition according to an embodiment includes a polyester capable of forming a crystal structure and a substance represented by the above general structural formula (1), and the substance represented by the above general structural formula (1) has a dehydration-condensed structure of two molecules of natural product-derived α-amino acids or a substitution structure thereof. However, the two molecules of two α-amino acids are not simultaneously glycine.

(Polyester Capable of Forming Crystal Structure)

First, the polyester capable of forming a crystal structure will be described.

As long as having at least one ester bond in one molecular chain and having properties capable of forming a crystal structure, any publicly disclosed material may be used as the polyester capable of forming a crystal structure according to an embodiment.

In an embodiment, the "polyester capable of forming a crystal structure" indicates a polyester in which at least part thereof can form a crystal structure and in which all molecular chains may not be regularly arranged.

In addition, even if all molecular chains have no regularity, a polyester in which molecular chain segments can be partly oriented may also be used.

Furthermore, the polyester capable of forming a crystal structure preferably has a linear structure but may also have a branched structure or the like.

As the polyester capable of forming a crystal structure, for example, poly(ethylene terephthalate), poly(trimethylene terephthalate), poly(butylene terephthalate), poly(ethylene naphthalate), poly(trimethylene naphthalate), and a biodegradable polyester may be mentioned. In addition, as the biodegradable polyester, a polyester is preferable which uses no petroleum resources, which is degradable in the natural world, which can be manufactured from natural resources, such as corns, which reduces emission of carbon dioxide, and which can contribute to the global warming prevention. However, the polyester capable of forming a crystal structure according to an embodiment may also be derived from petroleum resources. As the biodegradable polyester, for example, a polyester-based resin metabolized by microorganisms may be mentioned, and polyhydroxybutyrate, poly(lactic acid), polycaprolactone, poly(butylene succinate), poly(butylene succinate adipate), poly(tetramethylene adipate terephthalate), poly(butylene adipate terephthalate), poly(ethylene succinate), and a block copolymer thereof may be mentioned by way of example. Among the biodegradable polyesters, an aliphatic polyester is preferable because of its superior moldability, heat resistance, and impact resistance.

As the aliphatic polyester, for example, poly(oxalic acid), poly(succinic acid), poly(hydroxy butyric acid), poly(diglycolic acid), polycaprolactone, polydioxanone, and a poly(lactic acid)-based aliphatic polyester may be mentioned. Among those mentioned above, a poly(lactic acid)-based aliphatic polyester is preferable.

As the poly(lactic acid)-based aliphatic polyester, for example, a polymer of an oxyacid, such as lactic acid, malic acid, and glycolic acid, and a copolymer thereof may be mentioned. Among those mentioned above, a hydroxy carboxylic acid-based aliphatic polyester is preferably used, and in this type of polyester, a poly(lactic acid) is most preferable.

The biodegradable polyester can be manufactured by a publicly disclosed method. In particular, for example, a lactide method, a polycondensation between a polyalcohol and a polybasic acid, or an intramolecular polycondensation of a hydroxy carboxylic acid having a hydroxyl group and a carboxyl group in one molecule may be mentioned.

In particular, the poly(lactic acid)-based aliphatic polyester can be generally manufactured by a ring-opening polymerization method of a lactide, which is a cyclic diester, and a corresponding lactone, that is, by a so-called lactide method, and besides this lactide method, a direct dehydration condensation method of a lactic acid may also be used for manufacturing.

In addition, as a catalyst for a process for manufacturing the poly(lactic acid)-based aliphatic polyester, for example, a compound of metal, such as tin, antimony, zinc, titanium, iron, or aluminum, may be mentioned. Among those mentioned above, a tin-based catalyst and an aluminum-based catalyst are preferable, and in particular, tin octylate and aluminum acetylacetonate are preferable.

Among poly(lactic acid)s, in particular, a poly(L-lactic acid) manufactured by a lactide ring-opening polymerization is preferable. The reason for this is that when poly(L-lactic acid) is hydrolyzed, L-lactic acid is formed, and the safety for the living body can be ensured.

However, in the present application, the poly(lactic acid) is not limited to the L type. For example, a poly(lactic acid) including many L-lactic acid molecules and several percent of D-lactic acid molecules may also be used. On the other hand, a poly(lactic acid) including many D-lactic acid molecules and several percent of L-lactic acid molecules may also be used. In addition, a poly(lactic acid) including only D-lactic acid molecules may also be used.

In addition, although the biodegradable polyester may be synthesized by a publicly disclosed method, a common commercially available product may also be used. As a particular example of a commercially available product, for example, Lacea (manufactured by Mitsui Chemicals, Inc.), U'z (manufactured by Toyota Motor Corporation), and Nature Works (manufactured by Nature Works LLC) may be mentioned.

As a biodegradable polyester used for the resin composition according to an embodiment, those mentioned above by way of example may be used alone, or at least two thereof may be used in combination.

When at least two biodegradable polyesters are contained, the at least two biodegradable resins may form a copolymer or may be in a mixed state.

In addition, as long as the features of the present application are not degraded, besides the polyester capable of forming a crystal structure, the resin composition according to an embodiment may further include a polyester not forming a crystal structure, a resin other than polyesters, and the like.

For example, there may be mentioned hydrocarbon resins, such as polyethylene, polypropylene, polystyrene, and polybutadiene; polar vinyl plastics, such as poly(vinyl chloride), poly(vinyl acetate), poly(vinylidene chloride), ethylene-vinyl acetate copolymer, and poly(methyl methacrylate); linear plastics, such as polyacetal, polyamide, polycarbonate, poly(ethylene terephthalate), and poly(butylene terephthalate); cellulose-based plastics, such as cellulose acetate and cellulose butyrate; thermoplastic elastomers, such as a styrene-butadiene-based, a polyolefin-based, a urethane-based, a polyester-based, a polyamide-based, and a poly(vinyl chloride)-based elastomer; a formaldehyde resin, a phenol resin, an amino resin, an unsaturated polyester resin, a diallyl phthalate resin, an alkyd resin, an epoxy resin, a urethane resin, and a silicone resin. In addition, a poly(lactic acid) and a poly(butylene succinate) in each of which a decomposition speed is reduced may also be mentioned by way of example.

Those mentioned above may be used alone, or at least two thereof may be used in combination.

Furthermore, the resin composition according to an embodiment may also include a biodegradable resin other than the biodegradable polyester capable of forming a crystal structure.

For example, there may be mentioned polysaccharide derivatives, such as cellulose, starch, dextran, and chitin; peptides, such as collagen, casein, fibrin, and gelatin; poly(amino acid); poly(vinyl alcohol); polyamides, such as nylon 4 and nylon 2/nylon 6 copolymer; polyesters, such as poly(glycolic acid), poly(lactic acid), polysuccinate ester, polyoxalate ester, poly(hydroxybutyrate), poly(butylene diglycolate), polycaprolactone, and polydioxanone, each of which does not typically have a crystal structure;

Those mentioned above may be used alone, or at least two thereof may be used in combination.

The resin composition according to an embodiment preferably includes 25 to 99 percent by weight of the biodegradable polyester capable of forming a crystal structure and more preferably includes 50 to 97 percent by weight.

(Nucleating Agent)

Next, a nucleating agent which promotes the crystallization of the polyester capable of forming a crystal structure will be described.

In an embodiment, a substance which is represented by the following general structural formula (1) and which has a dehydration-condensed structure of two molecules of natural-product derived α-amino acids or a substitution structure thereof may be preferable as a nucleating agent. However, the above two molecules of amino acids are no simultaneously glycine.

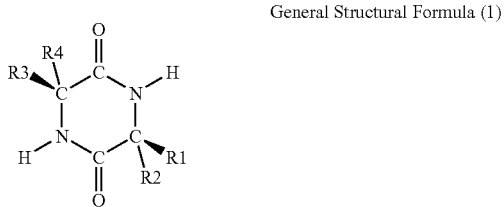

General Structural Formula (1)

In the above formula, R1, R2, R3, and R4 indicate groups or substitution groups thereof bonded to the α-carbons of the α-amino acids.

The two molecules of α-amino acids may be the same or may be different from each other. In addition, the two molecules of α-amino acids both may be the L-type or the D-type, or one of the two molecules of α-amino acids may be the L-type and the other may be the D-type.

In addition, it has been understood that the substance represented by the general structural formula (1) includes conformational isomers having different steric conformations, and any conformational isomer may be used. An isomer having a stable conformation in terms of energy is preferable.

The α-amino acid functioning as a constituent element of the substance represented by the general structural formula (1) according to an embodiment is preferably an amino acid present in the living body.

As particular α-amino acids, for example, there may be mentioned glycine, alanine, valine, leucine, isoleucine, serine, threonine, cysteine, methionine, phenylalanine, tryptophan, tyrosine, proline, glutamic acid, asparaginic acid, glutamine, asparagine, lysine, arginine, and histidine.

Among those mentioned above, glycine, alanine, valine, leucine, isoleucine, serine, threonine, cysteine, methionine, phenylalanine, tryptophan, tyrosine, proline, glutamine, and asparagine are preferable since each of which shows neutrality when the substance represented by the general structural formula (1) is hydrolyzed. In addition, among those mentioned above, in particular, glycine (in this case, the other α-amino acid is other than glycine), alanine, valine, methionine, and phenylalanine are preferable.

Besides those mentioned above, δ-hydroxylysine, 3,5-dibromotyrosine, 3,5-diiodotyrosine, 3,3,5'-triiodothyronine, thyroxine, hydroxyproline, and the like are also amino acids present in the living body and are each preferably used as a constituent element of the substance represented by the general structural formula (1) according to an embodiment.

In addition, the α-amino acid functioning as a constituent element of the substance represented by the general structural formula (1) according to an embodiment may be a non-natural product-derived amino acid and, for example, may be an amino acid having a substitution structure thereof. However, when the α-amino acid functioning as a constituent element is a natural product-derived amino acid, it is more preferable since the nucleating agent has biodegradable properties under the natural environment.

In an embodiment, the "substitution structure" indicates a structure in which a hydrogen atom of a group bonded to the α carbon of the natural product-derived α-amino acid is replaced with a substitution (A) which will be described below.

As the substitution (A) replacing a hydrogen atom of R1, R2, R3, and R4 of the general structural formula (1), for example, there may be mentioned a halogen atom (such as fluorine, chlorine, bromine, or iodine), a nitro group, a cyano group, a hydroxyl group, a thiol group, a sulfo group, a sulfino group, a mercapto group, a phosphono group, an alkyl group which may has a branched chain (such as a methyl group, an ethyl group, an isopropyl group, an n-propyl group, an n-butyl group, an isobutyl group, a secondary butyl group, a tertiary butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, or an eicosyl group), a hydroxyalkyl group (such as a hydroxymethyl group, a hydroxyethyl group, a 1-hydroxyisopropyl group, a 1-hydroxy-n-propyl group, a 2-hydroxy-n-butyl group, or a 1-hydroxy-isobutyl group), a halogenoalkyl group (such as chloromethyl, dichloromethyl, trichloromethyl, fluoromethyl, difluoromethyl, trifluoromethyl, 2-bromoethyl, 2,2,2-trifluoroethyl, pentafluoroethyl, 3,3,3-trifluoropropyl, 4,4,4-trifluorobutyl, 5,5,5-trifluoropentyl, or 6,6,6-trifluorohexyl), a cycloalkyl group (such as cyclopropyl, cyclobutyl, cyclopentyl, cyclohexyl, or cycloheptyl), an alkenyl group (such as vinyl, crotyl, 2-pentenyl, or 3-hexenyl), a cycloalkenyl group (such as 2-cyclopentenyl, 2-cyclohexenyl, 2-cyclopentenylmethyl, or 2-cyclohexenylmethyl), an alkynyl group (such as ethynyl, 1-propynyl, 2-propynyl, 1-butynyl, 2-pentynyl, or 3-hexynyl), an oxo group, a thioxo group, an amidino group, an imino group, an alkylenedioxy group (such as methylenedioxy or ethylenedioxy), an aromatic hydrocarbon group (such as an aromatic monocyclic hydrocarbon group including phenyl or biphenyl or an aromatic condensed ring hydrocarbon group), a cross-linked cyclic hydrocarbon group (such as 1-adamantyl or 2-norbornanyl), an alkoxy group (such as methoxy, ethoxy, propoxy, isopropoxy, butoxy, isobutoxy, sec-butoxy, tert-butoxy, pentyloxy, neopentyloxy, or hexyloxy), an amino group which may have a substituent group (such as amino, alkylamino, tetrahydropyrrole, piperazine, piperidine, morpholine, thiomorpholine, pyrrole, or imidazole), a hydroxyl group or a mercapto group which may have a substitution group, or a heterocyclic group which may have a substitution group (such as an aromatic heterocyclic group which contains, as an atom (ring member atom) forming a ring system, at least one heteroatom selected from an oxygen atom, a sulfur atom, and a nitrogen atom other than a carbon atom, and which includes pyridyl, furyl, thiazolyl, or the like, a saturated aliphatic heterocyclic group, or an unsaturated aliphatic heterocyclic group).

As particular examples of the substance represented by the above general structural formula (1), the following chemical formulas (1) to (26) may be mentioned.

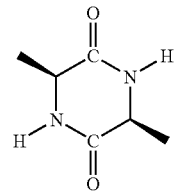

Chemical Formula (1)

Anhydride L-Alanine

Chemical Formula (2)

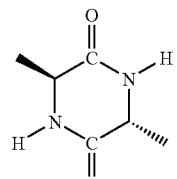

Anhydride DL-Alanine

Chemical Formula (3)

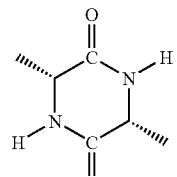

Anhydride D-Alanine

Chemical Formula (4)

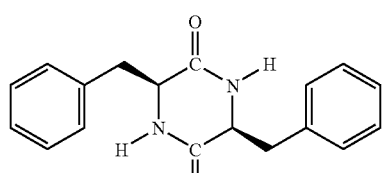

Anhydride L-Phenylalanine

Chemical Formula (5)

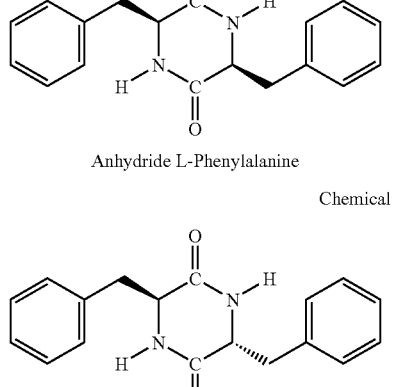

Anhydride DL-Phenylalanine

Chemical Formula (6)

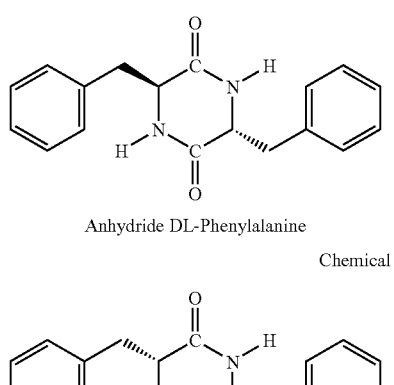

Anhydride D-Phenylalanine

Chemical Formula (7)

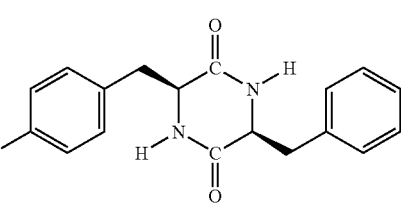

Anhydride L-Tyrosine

Chemical Formula (8)

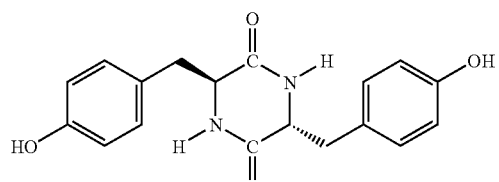

Anhydride DL-Tyrosine

Chemical Formula (9)

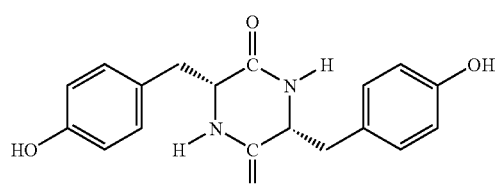

Anhydride D-Tyrosine

Chemical Formula (10)

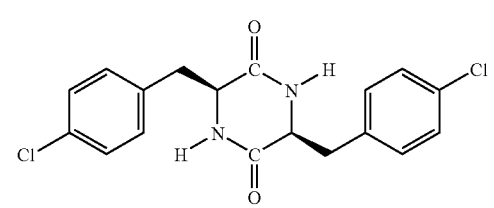

Anhydride L-p-Chlorophenylalanine

Chemical Formula (11)

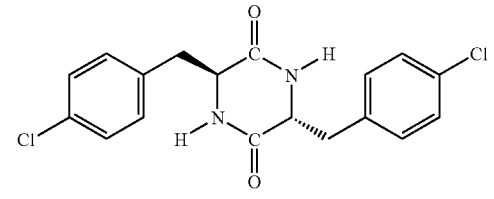

Anhydride DL-p-Chlorophenylalanine

Chemical Formula (12)

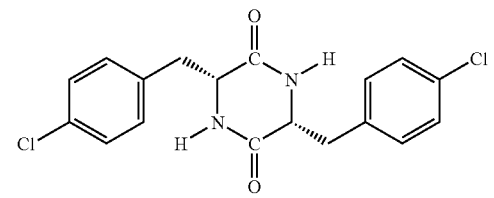

Anhydride D-p-Chlorophenylalanine

Chemical Formula (13)

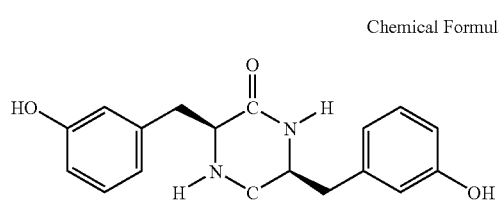

Anhydride L-m-Tyrosine

Chemical Formula (14)

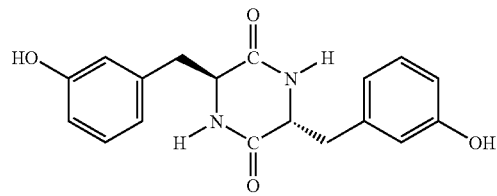

Anhydride DL-m-Tyrosine

Chemical Formula (15)

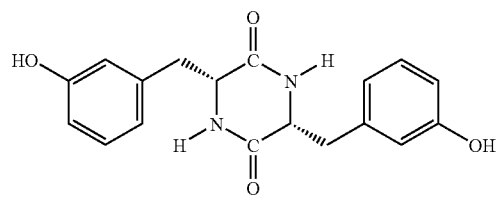

Anhydride D-m-Tyrosine

Chemical Formula (16)

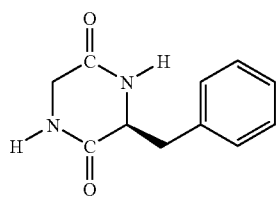

Cyclo-(-Gly-L-Phe)

Chemical Formula (17)

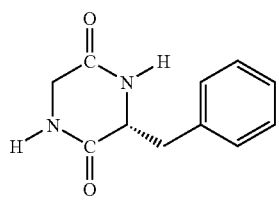

Cyclo-(Gly-D-Phe)

Chemical Formula (18)

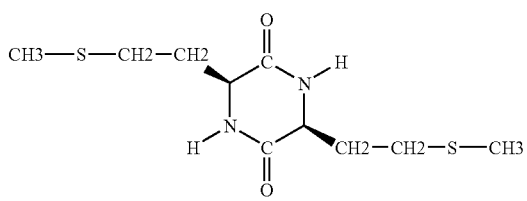

Anhydride L-Methionine

Chemical Formula (19)

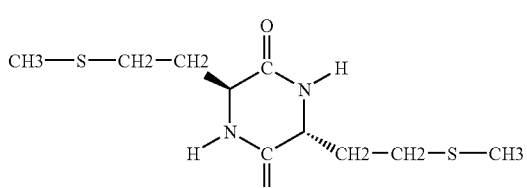

Anhydride DL-Methionine

Chemical Formula (20)

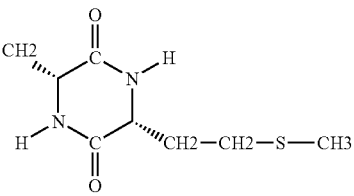

Anhydride D-Methionine

Chemical Formula (21)

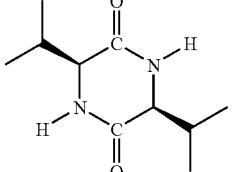

Anhydride L-Valine

Chemical Formula (22)

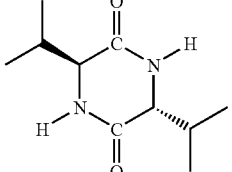

Anhydride DL-Valine

Chemical Formula (23)

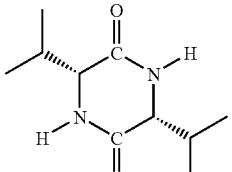

Anhydride D-Valine

Chemical Formula (24)

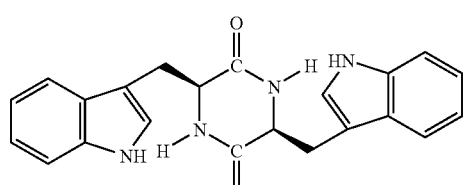

Anhydride L-Tryptophan

Chemical Formula (25)

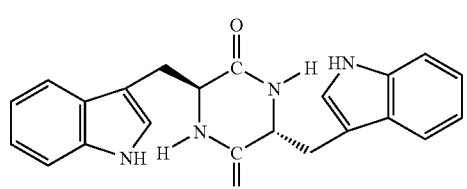

Anhydride DL-Tryptophan

Chemical Formula (26)

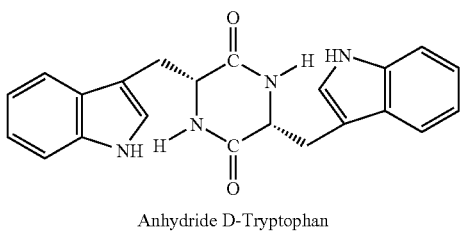

Anhydride D-Tryptophan

Among the chemical formulas (1) to (26), a substance obtained by dehydration condensation of two molecules of L-phenylalanine (diketopiperazine formed from two molecules of L-phenylalanine) is preferable. In addition, a substance obtained by dehydration condensation of two molecules of L-valine (diketopiperazine formed from two molecules of L-valine) is preferable. Furthermore, a substance obtained by dehydration condensation of two molecules of L-methionine (diketopiperazine formed from two molecules of L-methionine) and a substance obtained by dehydration condensation of two molecules of L-alanine (diketopiperazine formed from two molecules of L-alanine) are also preferable. In addition, a substance obtained by dehydration condensation between glycine and L-phenylalanine (diketopiperazine formed from glycine and L-phenylalanine) is also preferable.

As the above-described substance represented by the general structural formula (1) according to an embodiment, a commercially available product may be used. For example, a diketopiperazine formed from two molecules of phenylalanine may be purchased from Bachem AG.

In addition, the general structural formula according to an embodiment may be synthesized. As a particular example of the synthetic method, for example, the following three methods may be mentioned. In this case, the abbreviations are in accordance with the general rules. For example, Phe indicates phenylalanine. In addition, Cylco(-Phe-Phe) indicates a diketopiperazine formed from two molecules of phenylalanine.

<Method 1, Reference Document: Amino Acids (1977). NO. 12, pp. 41 to 47>

L-Phe-L-phe-OMe.HCl (1.5 g. 4.14 mmol) is dissolved in a methanol solution (50 ml) containing triethylamine (1.67 g, 16.5 millimoles) and is then stirred for 12 hours while being refluxed. In addition, after the solvent is removed using an evaporator, residues obtained thereby are washed with a small amount of cold 2-propanol, so that cyclo(-Phe-Phe) is obtained.

<Method 2, Reference Document: Agric. Biol. Chem. 52 (3), pp 819 to 827, 1988>

Z-Phen-phe-OMe (which is also called Cbz-: Benzylcarbonyl group) in an amount of 2 millimoles is dissolved in 50 ml of an acetic acid solution (99 percent) which is saturated with HBr at a temperature of 0° C. The solution thus formed is held for 30 minutes and is then processed with an ether. A crude product is dissolved at 0° C. in a methanol solution containing dry ammonium. The solution is transferred to a mess flask and is held for 12 hours at room temperature. A reaction mixture is processed using an evaporator in vacuum to remove volatile components. A remaining crystal is processed by suction filtration using methanol.

<Method 3, Reference Document: JOC. Vol. 33, No. 2, pp. 862 to 864, February 1968>

L-Phen-L-phe-OMe.HCl (0.5 g, 1.6 mmol) is added to 10 ml of phenol which is melted beforehand using a hot water bath at a temperature of 80° C. A reaction is carried out by stirring for 1 hour at 150° C. in a nitrogen stream atmosphere. Subsequently, after being heated to approximately 180° C., the reaction solution is preferably evacuated to 10 Torr or less, so that phenol and water produced by the reaction are distilled. A crude product thus obtained is washed with a water-ethanol mixture to remove phenol, so that cyclo(-Phe-Phe) is obtained.

The substance represented by the above general structural formula (1) used as a nucleating agent is preferably in the form of a powder capable of forming a crystal structure.

The grain diameter of the nucleating agent is preferably in the range of 0.001 to 10 μm and is more preferably in the range of 0.01 to 1 μm.

The amount of the nucleating agent in the resin composition is preferably set in the range of 0.001 to 10 parts by weight with respect to 100 parts by weight of the polyester capable of forming a crystal structure and is more preferably set in the range of 0.01 to 1 part by weight.

Since the grain diameter of crystal grains of the nucleating agent and the content thereof have influences on each other, it is necessary to determine the grain diameter and the content so as to sufficiently obtain an effect of the nucleating agent which promotes the crystallization of the polyester.

Since the substance represented by the general structural formula (1) may be able to form fine grains as compared to publicly disclosed talc used as a nucleating agent, the amount of the substance blended in the resin composition can be advantageously reduced.

Hereinafter, the optimum ranges of the content and the grain diameter of the nucleating agent added to the polyester capable of forming a crystal structure will be described.

When two resin compositions are prepared, and the contents of nucleating agents thereof are approximately equivalent to each other, a higher crystallization effect can be obtained by a nucleating agent having a smaller grain diameter. The reason for this is that as the grain diameter of the nucleating agent is decreased, the number of grains of the nucleating agent in the resin composition increases, and the number of nuclei also increases, so that the crystal is particularized.

In the case described above, when the gain diameter is decreased to one half, since the volume of one grain of the nucleating agent decreases to one eighth, the number of grains increases by 8 times. That is, when the grain diameter is decreased to one half, even if the addition amount is decreased to one eighth, an equivalent effect can be expected.

In addition, it is apparent that when nucleating agents having the same grain diameter are contained in polyesters, a polyester containing a larger addition amount has a higher nucleating effect.

In consideration of those described above, the optimum ranges of the content and the grain diameter of the nucleating agent will be described in detail. In this case, a simple model is formed in which the following (1) to (6) are assumed.

(1) In order to simplify the calculation, the density of the polymer capable of forming a crystal structure is assumed to be approximately equivalent to that of the nucleating agent.

(2) The grains of the nucleating agent are assumed to be not agglomerated at all and to be ideally uniformly dispersed in a resin composition, that is, the nucleating agent is present therein to form a cubic lattice.

(3) The crystal of the polymer capable of forming a crystal structure is assumed to have a cubic shape.

(4) As with the above (3), the grain of the nucleating agent is assumed to have a cubic shape.

(5) One resin crystal is assumed to be generated from one nucleating agent grain.

(6) As the polymer capable of forming a crystal structure, in this case, it is assumed that a poly(lactic acid) is used.

In the case in which the above (1) to (6) are assumed, the crystal size of a poly(lactic acid) can be obtained by volume calculation from the content (%) of the nucleating agent and the grain diameter thereof.

The calculation results are shown in the following Table 1.

TABLE 1

Crystal Size of Poly(Lactic Acid) (μm)

| | | Grain Diameter of Nucleating Agent (μm) | | | | | |
|---|---|---|---|---|---|---|---|
| | | 0.01 | 0.05 | 0.1 | 0.5 | 1 | 5 | 10 |
| Addition Amount of Nucleating Agent | 0.001% | 0.46 | 2.3 | 4.6 | 23 | 46 | 232 | 464 |
| | 0.01% | 0.22 | 1.1 | 1.3 | 6 | 13 | 108 | 215 |
| | 0.1% | 0.10 | 0.5 | 1.0 | 5 | 10 | 50 | 100 |
| | 1.0% | 0.05 | 0.2 | 0.5 | 2 | 5 | 23 | 46 |
| | 10% | 0.02 | 0.1 | 0.2 | 1 | 2 | 11 | 22 |

In particular, in the case in which the nucleating agent is contained in a poly(lactic acid) which is the polymer capable of forming a crystal structure, for example, when the crystal size (one side length) of the poly(lactic acid) is supposed to be X μm, the crystal size of the poly(lactic acid) including the volume of the nucleating agent located at the center thereof is represented by $X^3$ μm$^3$.

In addition, when the size (one side length) of the nucleating agent is supposed to be 0.05 μm, and the addition amount of the nucleating agent is supposed to be 0.5% (0.005 as the ratio), since $X^3 \times 0.005 = 0.05^3$ holds, the crystal size X of the poly(lactic acid) is calculated to be 0.29 μm.

In the case in which the nucleating agent is actually contained in the resin composition, with reference to the volume calculation as described above, the grain diameter and the content of the nucleating agent may be selected so as to obtain a necessary crystal size in accordance with the purpose.

For example, the case will be investigated in which a poly(lactic acid) is used as the polyester capable of forming a crystal structure, the temperature at which the poly(lactic acid) is crystallized is set to 120° C., and the time necessary for crystallization is set within approximately 1 minute.

The growth rate (dr/dt) of the radius (r) of the spherocrystal of the poly(lactic acid) at 120° C. is confirmed to be approximately 2 μm/minute.

In this case, in particular, when it is assumed that the growth rate of the radius of this spherocrystal is approximately equal to that of the cubic-shape crystal assumed as described above, the time necessary for the crystallization can be calculated. The calculation results are shown in the following Table 2.

TABLE 2

Crystallization Time of Poly(Lactic Acid) (sec)

| | | Grain Diameter of Nucleating Agent (μm) | | | | | | |
|---|---|---|---|---|---|---|---|---|
| | | 0.01 | 0.05 | 0.1 | 0.5 | 1 | 5 | 10 |
| Addition Amount of Nucleating Agent | 0.001% | 7.0 | 35 | 70 | 348 | 696 | 3,481 | 6,962 |
| | 0.01% | 3.2 | 16 | 19 | 94 | 189 | 1,616 | 3,232 |
| | 0.1% | 1.5 | 8 | 15 | 75 | 150 | 750 | 1,500 |
| | 1.0% | 0.7 | 3 | 7 | 35 | 70 | 348 | 696 |
| | 10% | 0.3 | 2 | 3 | 16 | 32 | 162 | 323 |

According to the calculation results shown in Table 2, for example, when the grain diameter of the nucleating agent is 1 μm, and the addition amount thereof is 1%, the crystallization time is calculated to be 70 seconds.

It was confirmed that in the resin composition, 0.001 to 10 parts by weight of the nucleating agent is preferably contained with respect to 100 parts by weight of the polyester capable of forming a crystal structure.

When the content of the nucleating agent is less than 0.001 parts by weight with respect to 100 parts by weight of the polyester, since the content is too low, the effect of promoting the crystallization of the polyester is difficult to obtain by addition of the nucleating agent.

On the other hand, when the content of the nucleating agent is more than 10 parts by weight with respect to 100 parts of the polyester, since the content of the nucleating agent is excessively high, a problem in that mechanical properties, such as rigidity, of a finally obtained resin composition are degraded may arise.

For example, when 10 parts by weight of a nucleating agent having a grain diameter of 10 μm is contained in the poly(lactic acid), and the crystallization is performed at a temperature of 120° C., the time necessary for the crystallization is estimated from the above Table 2 to be approximately 5 minutes.

That is, when the poly(lactic acid) is crystallized in a mold at a temperature of approximately 120° C. which is set by an injection molding machine, the time necessary for the crystallization is estimated to be approximately 5 minutes.

In this case, since being held in a high-temperature molten state in a cylinder of the molding machine, the resin may be thermally decomposed in some cases, and hence it is necessary to set the holding time in the mold to 5 minutes or less. Accordingly, a composition in which 10 parts by weight of a nucleating agent having a grain diameter of 10 μm is contained with respect to 100 parts by weight of the poly(lactic acid) is a boundary condition to satisfy an optimum content range of the nucleating agent.

In addition, when the poly(lactic acid) is crystallized using a nucleating agent having a grain diameter of 0.5 μm, in order to control the time necessary for crystallization within approximately 5 minutes, it is understood from Table 2 that the lower limit of the content of the nucleating agent is 0.001 parts by weight with respect to 100 parts by weight of the poly(lactic acid).

In addition, depending on the type of nucleating agent, agglomeration may be suppressed even when the grain diameter thereof is less than 0.5 μm, and in this case, the content can be further decreased. Furthermore, in the case in which a nucleating agent having a smaller grain size is used, when the dispersion of the nucleating agent in the resin is improved by using a certain type of agglomeration inhibitor, the content of the nucleating agent can also decreased.

When the grain diameter of the nucleating agent is too small, agglomeration may occur, the dispersibility thereof in the polyester capable of forming a crystal structure is degraded, and the nucleating agent is localized in the polyester, so that the substantial grain diameter may conversely increase in some cases. In consideration of the above phenomenon, the grain diameter of the nucleating agent is preferably set to 0.05 μm or more, and the agglomeration can be suppressed thereby, so that superior dispersibility in the resin can be ensured.

In order to expand practical versatility of an intended resin composition, the transparency thereof is preferably improved. For this purpose, the spherocrystal forming the polyester necessarily has a size smaller than the wavelength of visible light (400 to 800 nm). Accordingly, the grain of the nucleating agent contained in the polyester necessarily has a size smaller than the wavelength of visible light. In consideration of that described above, the grain diameter of the nucleating agent is preferably 0.5 μm or less and is more preferably 0.1 μm or less.

According to the preliminary calculation shown in Table 1, in order to sufficiently ensure the transparency of the resin composition, it is preferable that the grain diameter of the nucleating agent be set to 0.10 μm or less and that the addition amount thereof be set to 0.1 percent by weight or more. In order to more sufficiently ensure the transparency of the resin composition, the grain diameter of the nucleating agent is preferably set to 0.05 μm or less, and the addition amount thereof is preferably set to 0.1 percent by weight or more. In order to even more sufficiently ensure the transparency of the resin composition, the grain diameter of the nucleating agent is preferably set to 0.01 μm or less, and the addition amount thereof is preferably set to 0.001 percent by weight or more.

In addition, the "transparency" described above includes not only high transparency of a so-called glass or an amorphous polymer, such as a polystyrene, but also low transparency in a slightly clouded state, and hence, this low transparency is also regarded to have practical transparency.

As the index indicating the degree of turbidity, "haze" has been generally used. The measurement method is defined, for example, by JIS K7136 of Japanese Industrial Standards. In particular, the transparency is represented by a haze value of a plate made of a resin having a thickness of 1 mm. A smaller haze value indicates higher transparency.

For example, a publicly disclosed resin composition formed by adding a sorbitol-based material to polypropylene has high transparency, and a container manufactured therefrom has sufficient transparency so that food or the like placed therein can be recognized. In this case, the haze value is approximately 30%.

Incidentally, it is actually difficult to form a nucleating agent powder from grains having a single grain diameter. That is, the grain diameter of the nucleating agent has a certain distribution, and grains having larger grain diameter are also contained.

When grains having a grain diameter larger than the light wavelength are contained in the polymer, and the refractive index of the above grains is different from that of the polymer, the above grains function as an optically foreign material to the polymer, so that the transparency is degraded. In this case, the refractive index of the polyester capable of forming a crystal structure and the refractive index of the nucleating agent are preferably close to each other. In particular, when the refractive indexes thereof are within ± approximately 0.05, the grains of the nucleating agent may not function as an optically foreign material to the polyester.

If the refractive index of the polyester capable of forming a crystal structure and the refractive index of the nucleating agent are considerably different from each other, when the size of the nucleating agent is particularized, the transparency can be ensured. For example, when the nucleating agent is particularized to have a grain diameter of approximately several tens of nanometers, the visible light passes therethrough, and hence superior transparency can be ensured.

As described above, the optimum ranges of the content and the grain diameter of the nucleating agent are estimated by calculation based on the various assumptions; however, in practice, the nucleating agent may be agglomerated and may not be approximately uniformly dispersed in the polymer, and hence the grain diameter of the nucleating agent may have a distribution.

Accordingly, although it is believed that the content of the nucleating agent to the polyester is necessarily increased, in consideration of degradation in mechanical properties of the resin composition and the like, the content of the nucleating agent is preferably set to approximately 1 percent by weight.

Hence, in the resin composition, when the addition amount of the nucleating agent is set in the range of 0.01 to 1 part by weight to 100 parts by weight of the polyester, the effect of the nucleating agent can be further enhanced.

As a method for processing the nucleating agent according to an embodiment to obtain the desired grain diameter as described above, publicly disclosed methods may be used.

For example, either a mechanical pulverizing method or a chemical method may be used.

As the mechanical pulverizing method, for example, a method using a ball mil, a method using soft milling, and frost shattering may be mentioned. In addition, a pulverizing method, such as jet milling or air hammer, may also be used. In the methods mentioned above, grains are allowed to collide with each other from two directions along with air streams for pulverization.

As the chemical method, for example, recrystallization or spray drying may be mentioned.

When the substance represented by the general structural formula (1), which is the nucleating agent, is dissolved in a predetermined solvent and is then recrystallized, fine grains may also be obtained.

That is, fine grains can be obtained, for example, in such a way that by using the difference in solubility with temperature, a hot solution of the substance represented by the general structural formula (1) is cooled; a solution of the above substance represented by the general structural formula (1) is condensed by evaporating a solvent; or the solution thereof is diluted with another appropriate solvent so as to decrease the solubility.

In addition, spray drying may also be performed in which a solution containing the substance represented by the general structural formula (1) is sprayed to obtain fine grains by evaporating a solvent.

Furthermore, any publicly disclosed fine grain manufacturing methods may also be used.

When the grains of the nucleating agent are particularized by fine grain processing, agglomeration is liable to occur. Before the stage at which the nucleating agent is added to the polymer capable of forming a crystal structure, the powder state of the substance represented by the general structural formula (1), that is, whether the grains are agglomerated, are less agglomerated, or are not agglomerated, is not an important issue in the present application. However, at the stage at which the nucleating agent is added to the polymer to manufacture the resin composition, it is not preferable as described above that the grains of the nucleating agent be agglomerated in the polymer, and the nucleating agent is preferably uniformly dispersed therein. In order to achieve the state described above, before the stage at which the nucleating agent is added to the polymer, the agglomeration thereof is preferably suppressed as expected.

As a method for suppressing the agglomeration, a publicly disclosed method may be used.

For example, a method for adding an agglomeration inhibitor to the nucleating agent before, during, or after fine grain processing may be mentioned.

As the agglomeration inhibitor, a publicly disclosed material may be used, and for example, a low molecular weight polyethylene or a polyoxyethylene-based non-ionic surfactant may be mentioned. Among those mentioned above, a polyoxyethylene-based agglomeration inhibitor is preferable.

Although uniform dispersion of the nucleating agent in the polyester may be achieved only by the addition of the agglomeration inhibitor in some cases, a method for mixing the polyester and the nucleating agent is also important.

A mixing method will be described later.

When the resin composition according to an embodiment is molded into a product, and the product thus formed is discarded after the use within a short period of time, it is preferable that the polyester be easily biodegraded. For example, in recent years, it has been proposed that a degradable polymer, that is, a biodegradable polyester, is used for application having a short service period, such as a plastic shopping bag.

Furthermore, for the purposes as described above, research and development of promoting degradation of polymers has been carried out, and in the case of a polyester, a material promoting hydrolysis may be added thereto in some cases.

On the other hand, in the case in which a product formed by molding the resin composition according to an embodiment has a relatively long service period, for example, when the resin composition is used for chassis of electrical products or the like, it is preferable that the resin be not considerably degraded during the service period.

In order to achieve the above purpose, a material suppressing the degradation is necessarily added, and a so-called a hydrolysis suppressor is preferably added. Accordingly, the long-term reliability in the use of the molded product can be improved.

(Hydrolysis Suppressor)

As long as being capable of suppressing hydrolysis of a polyester, in particular, a biodegradable polyester, the hydrolysis suppressor is not particularly limited; however, for example, a compound having reactivity with active hydrogen of a biodegradable resin may be mentioned.

By addition of the compound described above as a hydrolysis suppressor, the amount of active hydrogen in a biodegradable resin of a resin composition is decreased, and hence a polymer chain forming the biodegradable resin is prevented from being catalytically hydrolyzed by active hydrogen.

The active hydrogen described above is hydrogen forming a bond between hydrogen and oxygen, nitrogen, or the like (such as O—H bond or N—H bond) and has high reactivity as compared to that of a bond between hydrogen and carbon (C—H bond). In particular, for example, hydrogen atoms of a carboxyl group (—COOH), a hydroxyl group (—OH), an amino group (—NH$_2$), and an amide bond (—NHCO—) of a biodegradable resin are active hydrogen.

As the hydrolysis suppressor, for example, a carbodiimide compound, an isocyanate compound, or an oxazoline compound may be mentioned, and those mentioned above may be used alone, or at least two thereof may be used in combination.

In particular, the carbodiimide compound can be easily melted and compounded with a biodegradable resin, and by adding a small amount, a hydrolysis suppressing effect can be obtained; hence, the carbodiimide compound is a preferable material.

The carbodiimide compound used as a hydrolysis suppressor is a compound having at least one carbodiimide group in one molecule and also includes a polycarbodiimide compound and the like.

As a monocarbodiimide compound included in this carbodiimide compound, for example, dicyclohexylcarbodiimide, diisopropylcarbodiimide, dimethylcarbodiimide, diisobutylcarbodiimide, dioctylcarbodiimide, diphenylcarbodiimide, or naphthylcarbodiimide may be mentioned, and among those mentioned above, dicyclohexylcarbodiimide and diisopropylcarbodiimide, which are easily and industrially available, are particularly preferable.

As the isocyanate compound used as a hydrolysis suppressor, for example, there may be mentioned 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, tetramethylene diisocyanate, 1,6-hexamethylene diisocyanate, dodecamethylene diisocyanate, trimethylhexamethylene diisocyanate, 1,3-cyclohexylene diisocyanate, 1,4-cyclohexylene diisocyanate, xylylene diisocyanate, tetramethylxylylene diisocyanate, hydrogenated xylylene diisocyanate, lysine diisocyanate, isophorone diisocyanate, 4,4'-dicyclohexylmethane diisocyanate, and 3,3'-dimethyl-4,4'-dicyclohexylmethane diisocyanate.

As the oxazoline compound used as a hydrolysis suppressor, for example, there may be mentioned 2,2'-o-phenylenebis(2-oxazoline), 2,2'-m-phenylenebis(2-oxazoline), 2,2'-p-phenylenebis(2-oxazoline), 2,2'-p-phenylenebis(4-methyl-2-oxazoline), 2,2'-m-phenylenebis(4-methyl-2-oxazoline), 2,2'-p-phenylenebis(4,4'-dimethyl-2-oxazoline), 2,2'-m-phenylenebis(4,4'-dimethyl-2-oxazoline), 2,2'-ethylenebis(2-oxazoline), 2,2'-tetramethylenebis(2-oxazoline), 2,2'-hexamethylenebis(2-oxazoline), 2,2'-octamethylenebis(2-oxazoline), 2,2'-ethylenebis(4-methyl-2-oxazoline), and 2,2'-di phenylenebis(2-oxazoline).

The hydrolysis suppressor described above can be easily manufactured by a publicly disclosed method, and a commercially available product may also be appropriately used. As the commercially available product, for example, carbodiimide (trade name: Carbodilite) manufactured by Nisshinbo Chemical Inc. may be used.

Since the biodegradation rate of the resin composition can be adjusted by the type and the addition amount of the hydrolysis suppressor, in accordance with an intended product, the type and the addition amount of the hydrolysis suppressor may be determined. That is, depending on what temperature is used, what humidity is used, and how long the hydrolysis is suppressed, the type and the addition amount of the hydrolysis suppressor to be added may be determined.

In particular, when the hydrolysis suppressor is added to a consumer durable good, such as a home electrical appliance, the addition amount of the hydrolysis suppressor is generally 0.1 to 5 percent by weight with respect to the total weight of the resin composition and is preferably 0.5 to 2 percent by weight.

(Inorganic Filler)

In addition, an inorganic filler may be added to the resin composition according to an embodiment. The heat resistance, the rigidity, and the like can be improved thereby.

As the inorganic filler, a publicly disclosed material, such as talc, alumina, silica, magnesia, mica, or kaolin may be mentioned, and those mentioned above may be used alone, or at least two thereof may be used in combination.

When a poly(lactic acid) is used as the polyester capable of forming a crystal structure, it was confirmed that even when talc, which is an inorganic filler, is used together with the substance represented by the general structural formula (1) used in the present application, an effect of promoting the crystallization is obtained while the nucleating effects thereof are not counteracted with each other. Accordingly, when the substance represented by the general structural formula (1) used in the present application and an inorganic filler are used in combination, it is confirmed that talc is a preferable material.

In this case, the addition amount of the inorganic filler is preferably set in the range of 1 to 50 parts by weight with respect to 100 parts by weight of the polyester capable of forming a crystal structure.

When the addition amount of the inorganic filler is less than 1 part by weight with respect to 100 parts by weight of the polyester, since the addition amount of the inorganic filler is too small, the effect of improving the heat resistance and the rigidity of the resin composition may not be sufficiently obtained.

On the other hand, when the addition amount of the inorganic filler is more than 50 parts by weight with respect to 100 parts by weight of the polyester, since the addition amount of the inorganic filler is excessively large, a finally obtained resin composition may become fragile.

Hence, by adding 1 to 50 parts by weight of the inorganic filler to 100 parts by weight of the polyester, the effect of improving the heat resistance and the rigidity can be obtained, and the resin composition can be prevented from being fragile.

(Others)

In the resin composition according to an embodiment, as long as the promotion of the crystallization by the nucleating agent described above is not considerably suppressed, for example, at least one of an antioxidant, a light stabilizer, an UV absorber, a pigment, a colorant, an antistatic agent, a mold release agent, a fragrance, a lubricant, a flame retardant, a filler, and an antimicrobial fungicide may be added.

The resin composition according to an embodiment can be manufactured by mixing the above-described polyester capable of forming a crystal structure, the nucleating agent represented by the general structural formula described above, and the above-described other additives.

As a manufacturing method, for example, there may be mentioned a method in which, for example, after a nucleating agent, an inorganic filler, and a hydrolysis suppressor are mixed with a polyester used as a raw material, the mixture thus obtained is melted and compounded by an extruder.

As another method, for example, a solution method may be mentioned.

The solution method is a method in which individual components used as raw materials and an arbitrary solvent capable of dispersing or dissolving the individual components are sufficiently stirred to form a slurry, and the solvent is then removed by a publicly disclosed method, such as drying. In addition, the method for manufacturing a resin composition is not limited to those described above, and other publicly disclosed methods may also be used.

In the resin composition according to an embodiment, it is important that a compound functioning as a nucleating agent be approximately uniformly dispersed in the polyester capable of forming a crystal structure.

In order to obtain an approximately uniform dispersion, a publicly disclosed method (a mixing method) may be used. For example, there may be mentioned a method in which a pigment is dispersed in a resin for coloration, a method using a three-roll mill, and a method in which simple heating and compounding are repeated at least two times.

In particular, first, pellets made of the polyester capable of forming a crystal structure, such as a poly(lactic acid), are dried by evacuation, for example, at 60° C. for 5 hours. Next, a predetermined amount of the pellets of this polyester and a predetermined amount of a compound functioning as a nucleating agent are weighed, followed by mixing using a mixer or the like. Subsequently, after this mixture is heated and compounded using a biaxial compounding machine or the like, the compound thus obtained is then cooled and is formed into a strand, and the strand thus formed is cut into pellets, followed by performing drying by hot wind. The temperature for heating and compounding is a temperature between the melting point of the polyester capable of forming a crystal structure, such as a poly(lactic acid), and a temperature which is higher than the above melting point by +50° C. However, depending on the case, heating and compounding may be performed at a higher temperature such as a temperature right below the decomposition temperature of the polyester capable of forming a crystal structure, such as a poly(lactic acid).

By the process as described above, a resin composition can be obtained in which the compound functioning as a nucleating agent is approximately uniformly dispersed in the polyester.

In addition, instead of the evacuation drying, for example, dehumidification drying or hot wind drying may be performed on the pellets of the polyester capable of forming a crystal structure, such as a poly(lactic acid), at a temperature of 80° C. for 12 hours. Although the dehumidification drying is preferable, the evacuation drying is more preferable.

(Resin Molded Product)

By performing a heating step and a packing/holding step on the resin composition described above, a resin molded product can be manufactured.

As long as the resin composition can be heated and melted, any step may be used as the heating step performed when the resin molded product is manufactured from the resin composition. As a heating measure, for example, a publicly disclosed measure, such as a heater, may be mentioned. The heating temperature is generally in the range of approximately +10° C. to +50° C. higher than the melting point of the resin composition and is preferably in the range of +15° C. to +30° C. higher than the melting point of the resin composition. However, depending on the case, the heating temperature may be set to a higher temperature, such as just below the decomposition temperature of the resin composition, in some cases.

The melting point is measured by a differential scanning calorimeter (DSC) or the like. As a method for measuring the melting point, the following method may be mentioned as a particular example. For example, when the polymer capable of forming a crystal structure is a poly(lactic acid), first, 3 to 4 mg is cut from a resin composition formed using the poly(lactic acid) and is placed in an aluminum pan to be used as a sample. Next, after the sample is once heated to 200° C. and is then cooled to 0° C. at a rate of 50° C./minute, DSC measurement is preformed while the temperature is increased at a temperature rise rate of 20° C./minute, and for example, the temperature of an endothermic peak in the vicinity of approximately 160° C. is obtained as the melting point.

As the packing/holding step, a publicly disclosed step may be used as long as it can pack and hold a molten resin composition obtained by the heating step in a mold.

As the mold, any mold in which the temperature is maintained in the range of approximately −50° C. to +30° C. of the crystallization temperature of the resin composition may be used, and the type and the like of the mold are not particularly limited. As a measure for maintaining a mold temperature, a publicly disclosed measure may be used, and as the temperature maintaining measure, for example, there may be mentioned a measure in which a heating medium, such as hot water, pressurized hot water, or oil, is allowed to flow through a water tube embedded in a mold, and a measure using a heater and a thermostat.

When the resin molded product is manufactured from the resin composition, in view of the crystallization of the resin composition and the prevention of heat distortion of the molded product, the temperature of the mold is generally set in the range of approximately −50° C. to +30° C. of the crystallization temperature of the resin composition and is preferably set in the range of approximately 90° C. to 140° C.

The crystallization temperature can be measured by DSC measurement or the like. As a method for obtaining the crystallization temperature, the following method may be mentioned as a particular example. For example, when the polymer capable of forming a crystal structure is a poly(lactic acid), 3 to 4 mg is cut from the resin composition thereof and is placed in an aluminum pan to be used as a sample. Next, after the sample is once heated to 200° C., DSC measurement is preformed while the sample is cooled to 0° C. at a rate of 20° C./minute, and for example, the temperature of an exothermic peak in the vicinity of approximately 120° C. is obtained as the crystallization temperature.

When the resin composition is formed from a plurality of polymers, a plurality of endothermic peaks and a plurality of exothermic peaks derived therefrom may be measured by DSC measurement.

In this case, an endothermic peak temperature derived from a primary polymer (having the highest content) among the plurality of polymers is regarded as the melting point of the resin composition, and in the same manner as described above, an exothermic peak temperature of the primary polymer is regarded as the crystallization temperature.

In the packing/holding step, the molten resin composition is packed in a mold, and although the temperature of the molten resin composition is higher than the temperature of the mold, it gradually comes close to the temperature of the mold with the elapse of time.

As a packing measure, any measures may be used as long as being capable of packing the molten resin composition in a mold, and a publicly disclosed method may be used. For example, a measure in which the molten resin composition is injected into a mold by applying a pressure may be mentioned.

As a cooling measure, any measures may be used as long as being capable of cooling the molten resin composition, and a publicly disclosed measure may be used.

As a cooling method, a publicly disclosed method may be used as long as being capable of cooling the molten resin composition, and the cooling time and the like are not particularly limited. Either rapid cooling or slow cooling may be used.

In a cooling step, for example, a spontaneous cooling measure or a rapid cooling measure (using water, ice, iced water, dry ice, liquid nitrogen, or the like) may be used.

In view of the crystallization and the productivity of the resin composition, the packing/holding time is more preferably in the range of approximately 10 seconds to 4 minutes and most preferably in the range of approximately 20 seconds to 1 minute.

In addition, immediately after the crystallization of the resin composition is completed, the molded product is recovered from a mold. In addition, even when the crystallization is not fully completed, the molded product may be recovered from a mold.

When the crystallization is advanced to a certain extent, the elastic modulus is improved; hence, the molded product of the resin composition may be recovered from a mold in some cases without causing deformation. In this case, the molded product recovered from a mold is further crystallized by its own remaining heat, and the crystallization is approximately completed until the molded product is cooled to room temperature.

After the packing/holding step, the temperature of the molded product is preferably as low as possible when it is recovered from a mold. As a measure for decreasing the temperature of the molded product, for example, a measure may be mentioned in which cold air is blown to the molded product when a mold is opened. When the temperature of the molded product is decreased as described above, deformation risk of the molded product can be reduced.

In addition, as a method for manufacturing the resin molded product from the resin composition, for example, a publicly disclosed method, such as a cast molding method, a compression molding method, a transfer molding method, an injection molding method, an extrusion molding method, an inflation method, a calendering method, a blowing method, a vacuum molding method, a laminate molding method, a spray-up method, a foaming method, a matched die molding method, or an SMC method may be used.

When the resin composition is molded by the method as mentioned above, a publicly disclosed molding machine, such as an injection molding machine, is preferably used.

Next, the method for manufacturing the resin molded product from the resin composition will be described in detail.

First, by using a publicly disclosed injection molding machine, the resin composition is heated to and melted at a temperature of approximately +15 to +30° C. higher than the softening point thereof.

Next, the molten resin composition is injected into a mold having a temperature maintained in the range of −50° C. to +30° C. of the crystallization temperature of the resin composition.

Subsequently, after the injection is performed, upon request, a pressure is continuously applied to the molten resin composition in the mold in order to compensate for so-called "sink".

Next, the molten resin composition is released from the pressure and is held for a predetermined time. This holding time is generally called a cooling time. During the holding time from the injection of the molten resin composition into the mold to the release of the holding pressure applied to the molten resin composition in the mold, heat gradually flows from the resin composition to the mold, so that the temperature of the resin composition in the mold gradually decreases.

Accordingly, substantially, it is sometimes considered that the holding time is included in the cooling time.

In this embodiment, the holding time after releasing the holding pressure is called "cooling".

The injection rate, injection pressure, injection time, holding pressure, holding time, and the like are appropriately determined depending on the type of resin of the resin composition, the shape of the mold, and the like.

The cooling time may be set to a time in which the crystallization of the resin molded in conformity with the shape of the mold is approximately completed, and the cooling time is generally 1 minute or less and is preferably in the range of approximately 20 seconds to 1 minute.

In addition, when the molten resin composition is packed and held in the mold which is maintained at a temperature in the range of −50° C. to +30° C. of the crystallization temperature of the resin composition, the polymer capable of forming a crystal structure can be rapidly crystallized in the mold. As a result, the molding cycle can be shortened, the productivity can be improved, and the yield can also be improved.

According to the above description of the manufacturing method, the crystallization of the molten resin composition performed in molding is primarily focused; however, by the manufacturing method described above, besides the crystallization, the following two problems can also be solved. Hereinafter, the problems will be described in detail.

Although the temperature of the mold is generally set to Tg of the resin or less, when the molten resin composition is injected into the mold maintained at the temperature as described above, the heat of the injected molten resin composition rapidly flows to the mold, and hence the molten resin composition becomes unlikely to flow in the mold. Hence, a flow mark is formed in the surface of the molded product and/or a weld line is liable to be clearly formed therein.

In addition, since the molten resin composition is unlikely to flow, when the resin composition is injected in a mold having a complicated shape, the number of gates is inevitably increased so as to reliably fill the molten resin composition in the mold.

As a result, runners are increased in accordance with the number of gates, and hence the amount of the molten resin composition corresponding to the volume of the runners is wastefully used.

On the other hand, the mold temperature of the above-described manufacturing method is higher than the mold temperature of a related art.

Accordingly, the heat flowing from the injected molten resin composition to the mold is small as compared to that of a related art, and as a result, the fluidity of the molten resin composition in the mold is superior to that of a related art.

Hence, problems of flow marks and weld lines are not likely to occur.

In addition, the number of gates can be decrease as compared to that of a related art, and the amount of the molten resin composition wastefully used due to the presence of runners can be further decreased.

The method for manufacturing the resin molded product from the resin composition is not limited to that described above, and in accordance with an ordinary method, molding may be performed at a mold temperature lower than Tg.

For example, when the polymer capable of forming a crystal structure is a poly(lactic acid), molding may be performed by an ordinary method in such a way that the mold temperature is set, for example, to 50° C. which is lower than a glass transition temperature Tg of 60° C. of the poly(lactic acid).

In the case described above, in order to ensure the heat resistance, it is necessary to crystallize the polymer by a heat treatment after molding; however, since the crystallization of the resin composition can be promoted by the nucleating agent, the heat treatment time can be made shorter than that for crystallization of a related resin composition, and the yield can also be improved.

However, when the crystallization of a polymer capable of forming a crystal structure is not so much important, the heat treatment may not be performed.

The resin composition described above may be widely used for various molded products.

In addition, since the resin composition has high crystallinity, the resin molded product according to an embodiment has superior rigidity, and the transparency thereof can also be improved; hence, the resin molded product can be suitably used for products which are desired to have superior rigidity, transparency, and the like.

In particular, as applications of the resin molded product, for example, there may be mentioned generators, electrical motors, potential transformers, current transformers, voltage controllers, rectifiers, inverters, electrical relays, power contacts, switches, breakers, knife switches, multipolar rods, cabinets for electrical components, light sockets, various terminal plates, electrical device components such as a plug and a power module, sensors, LED lamps, connectors, resistors, relay cases, small switches, coil bobbins, capacitors, casings for variable capacitors, optical pickups, oscillators, transformers, printed-circuit boards, tuners, speakers, microphones, headphones, storage devices (used for a floppy (registered trademark) disc, an MO disc, and the like), small motors, magnetic head bases, semiconductors, liquid crystals, FDD carriages, FDD chassis, printers such as an inkjet printer and a thermal-transfer printer, ink casings for printers, motor brush holders, electronic components represented, for example, by a parabola antenna-related and a computer-related component, VTR components, television components, chassis of electrical apparatuses, chassis of electronic apparatuses (such as a television and a personal computer), irons, hair dryers, rice cooker components, microwave oven components, audio device components of acoustic products, audio device components such as an audio laser disc and a compact disc, illumination components, refrigerator components, air conditioner components, electrical product components (for both office use and household use, such as a typewriter component and a word processor component), office computer-related components, telephone-related components, facsimile-related components, copy machine-related components, washing units, motor components, machine-related components (such as a lighter and a typewriter), microscopes, binoculars, optical devices (such as a camera and a watch), precision machine-related components, alternator terminals, alternator connectors, IC regulators, potentiometer bases for light dimmers, various valves (such as an exhaust gas valve), various fuel-related, exhaust-related, and intake-related pipes, air intake nozzle snorkels, intake manifolds, fuel pumps, joints for engine cooling water, carburetor main bodies, carburetor spacers, exhaust gas sensors, cooling water sensors, oil temperature sensors, brake pad wear sensors, throttle position sensors, crank shaft position sensors, air flow meters, brake pad abrasion sensors, thermostat bases for air conditioners, air flow control valves for heating, brush holders for radiator motors, water pump impellers, turbine vanes, wiper motor-related components, distributors, starter switches, starter relays, wire harnesses for transmission, window washer nozzles, panel switch boards for air conditioners, coils for fuel-related solenoid valves, fuse connectors, horn terminals, insulation plates of electrical components, step motor rotors, lamp sockets, lamp reflectors, lamp housings, brake pistons, solenoid bobbins, automobile/vehicle-related components (such as an engine oil filter, an ignition device case, and a wheel), machine mechanism components (such as a gear, a rotary shaft thereof, a bearing, a rack, a pinion, a cam, a crank, and a crank arm), and packaging materials.

As another application of the resin molded product, for example, protection cases for the above electrical products may also be mentioned. For example, a protection case called a marine case may be mentioned which receives a non-water resistant digital camera therein and which enables it to be used under water-splashing conditions. In addition, as another application of the resin molded product, for example, there may be mentioned storage cases in which the above electrical products are received and stored, and transport cases in which the above electronic products are received and transported.

Furthermore, as another application of the resin molded product, for example, information recording media, such as various optical discs (such as a laser disc (registered trademark), a DVD, a HD-DVD, a Blu-ray disc, mini-disc, and an optical magnetic disc) may also be mentioned. In addition, cases which receive and store the discs mentioned above, that is, so-called jewel cases and digipaks, may also be mentioned.

In addition, as another application of the resin molded product, a food packaging application may also be mentioned, that is, the resin molded product may be used for food storage containers, lids thereof, and the like, and may also be applied to toys, which can also be formed from a related resin molded product.

In particular, since the crystallinity of the resin composition according to an embodiment is improved, the resin composition is preferably used for chassis of electrical apparatuses and chassis of electronic apparatuses (such as a television and a personal computer) which are strongly requested to have superior heat resistance.

In addition, when primarily including an aliphatic polyester, in particular, a poly(lactic acid), the resin molded product may be simply discarded by a biodegradation treatment after the use thereof, and hence extra energy is not advantageously used for the discard.

When the substance represented by the general structural formula (1) according to an embodiment includes a natural product-derived amino acid as a constituent element, depending on the type thereof, the substance is absorbed and decomposed by microorganisms. In addition, when the substance represented by the general structural formula (1) according to an embodiment loses its cyclic structure since being hydrolyzed for a long period time after the discard and has a structure in which two molecules are simply connected to each other, depending on the type thereof, the structure is absorbed and decomposed by microorganisms. In addition, since two amino acids finally formed by hydrolysis are amino acids present in the natural world, regardless of the types thereof, the amino acids are absorbed and decomposed by microorganisms. Hence, extra energy is not consumed after the discard of the resin molded product according to an embodiment, and no residual waste problems may arise.

That is, the whole resin composition also advantageously has biodegradable properties.

EXAMPLES

A particular sample of the resin composition according to an embodiment was formed, and the properties thereof were evaluated.

Example 1

As a polyester capable of forming a crystal structure, a poly(lactic acid) (trade name: H100J) manufacturing by Mitsui Chemicals, Inc. was used, and the content thereof was set to 90 parts by weight.

After 10 parts by weight of diketopiperazine of L-phenylalanine (CAS No. 2862-51-3) manufactured by Bachem AG. was added as a nucleating agent, a mixture thus formed was compounded while being heated to the range of 160 to 180° C. and was then formed into pellets.

The pellets thus formed were a resin composition sample of Example 1.

Example 2

In this example, 87 parts by weight of a poly(lactic acid) (trade name: H100J) manufacturing by Mitsui Chemicals, Inc., 3 parts by weight of carbodiimide (trade name: Carbodilite) manufactured by Nisshinbo Chemical Inc., and 10 parts by weight of diketopiperazine of L-phenylalanine (CAS No. 2862-51-3) manufactured by Bachem AG. were prepared, and in accordance with Example 1, a resin composition sample of Example 2 was formed.

Example 3

A resin composition sample of Example 3 was formed in a manner similar to that in Example 1 except that as the polyester capable of forming a crystal structure, 99 parts by weight of a poly(lactic acid) (trade name: H100J) manufacturing by Mitsui Chemicals, Inc. was used and that 1 part by weight of diketopiperazine of L-phenylalanine used in Example 1 was added.

Example 4

A resin composition sample of Example 4 was formed in a manner similar to that in Example 1 except that 10 parts by weight of diketopiperazine of L-valine (CAS No. 19943-16-9) manufactured by Bachem AG. was used as a nucleating agent.

Comparative Example 1

A resin composition sample of Comparative Example 1 was formed in a manner similar to that in Example 1 except that as the polyester capable of forming a crystal structure, a poly(lactic acid) (trade name: H100J) manufacturing by Mitsui Chemicals, Inc. was used and that the content was set to 100 parts by weight.

Comparative Example 2

A resin composition sample of Comparative Example 2 was formed in a manner similar to that in Example 1 except that as a nucleating agent, 10 parts by weight of phthalhydrazide manufactured by Acros Organics was used instead of diketopiperazine of phenylalanine.

Comparative Example 3

A resin composition sample of Comparative Example 3 was formed in a manner similar to that in Example 1 except that as a nucleating agent, 10 parts by weight of talc (trade name: LMS-200) manufactured by Fuji Talc Industrial Co., Ltd. was used instead of diketopiperazine of phenylalanine.

Comparative Example 4

A resin composition sample of Comparative Example 4 was formed in a manner similar to that in Example 1 except that as a nucleating agent, 10 parts by weight of L-phenylalanine manufactured by Kanto Chemical Co., Inc. was used instead of diketopiperazine of phenylalanine.

Comparative Example 5

A resin composition sample of Comparative Example 5 was formed in a manner similar to that in Example 2 except that as a nucleating agent, 10 parts by weight of L-phenylalanine manufactured by Kanto Chemical Co., Inc. was used instead of diketopiperazine of phenylalanine.

Comparative Example 6

A resin composition sample of Comparative Example 6 was formed in a manner similar to that in Example 1 except that as a nucleating agent, 10 parts by weight of anhydrous glycine (diketopiperazine formed of two glycine molecules, CAS No. 106-57-0) manufactured by Nacalai Tesque, Inc. was used instead of diketopiperazine of phenylalanine.

[Evaluation]
(Crystallization Temperature)

The crystallization temperatures of the resin composition samples of the above Examples 1 to 4 and Comparative Examples 1 to 6 were each measured by a scanning calorimeter (DSC) measurement method.

In particular, first, 3 to 4 mg was cut from each resin composition sample so as to be used as a test piece. This test piece was placed in an aluminum pan to form a test sample. Next, the test sample was heated to 200° C. and was then cooled at a rate of 20° C./minute, and in this step, an exothermic peak temperature in the vicinity of approximately 120° C. obtained by the crystallization was measured as the crystallization temperature.

(Calorific Value of Crystallization)

The quantity of heat of the above exothermic peak was obtained and was then normalized by the weight of the resin composition. The results of the samples are shown in the following Table 3.

(Durability)

As evaluation of long-term durability, the molecular weight of the poly(lactic acid) was measured after it was stored under high-temperature and high-humidity conditions. In particular, first, several grams of each resin composition sample was placed in a thermostatic bath at a temperature of 85° C. and at a relative humidity of 80%, and the molecular weights measured after 8 hours and 96 hours from the start of the storage were each compared with the molecular weight before the start of the high-temperature and high-humidity storage (initial stage).

The measurement of the molecular weight was performed using a gel permeation chromatography (GPC), and the weight average molecular weight (molecular weight in the form of polystyrene) was measured.

After a test specimen was dissolved in chloroform so as to have a concentration of 0.15 percent by weight and was stirred for 2 hours, a solution thus obtained was allowed to pass through a 0.25-μm filter, so that a sample was obtained.

An apparatus used for the evaluation was as follows.
Apparatus: MILLIPORE Waters 600E system controller
Detector: UV (Waters 484) and R1 (Waters 410)

The molecular weight before the high-temperature and high-humidity storage was used as the reference, and the molecular weight after the storage was normalized (represented by percent).

The results of each evaluation are shown in the following Table 3. In both evaluations of the crystallization and the durability, ○, Δ, and x are used to indicate Good, Fair, and No Good, respectively. In addition, as for the overall judgment, ◎ indicates excellent, ○ indicates Good, Δ indicates Fair, and x indicates No Good.

TABLE 3

| | Evaluation of Crystallization | | | Evaluation of Durability | | | | |
| | | | | Initial | Molecular Weight Retention (%) | | | |
| | Crystallization Temperature (° C.) | Calorific Value of Crystallization (J/g) | Judgment | Molecular Weight ($10^4$) | After 8 Hours | After 96 Hours | Judgment | Overall Judgment |
|---|---|---|---|---|---|---|---|---|
| Example 1 | 117.7 | 37 | ○ | 10.3 | 73.0 | 7.0 | X | ○ |
| Example 2 | 114.5 | 30 | ○ | 13.4 | 103.0 | 101.0 | ○ | ◎ |
| Example 3 | 115.9 | 10 | ○ | — | — | — | — | ○ |
| Example 4 | 109.4 | 27 | ○ | — | — | — | — | ○ |
| Comparative Example 1 | Not observed | 0 | X | 11.2 | 59.0 | — | X | X |
| Comparative Example 2 | 95.0 | 3.7 | X | — | — | — | — | X |
| Comparative Example 3 | 108.3 | 31 | Δ | — | — | — | — | Δ |
| Comparative Example 4 | 101.0 | 35 | Δ | 9.6 | 63.0 | 7.0 | X | Δ |
| Comparative Example 5 | 92.0 | 1.5 | X | 12.1 | — | 4.0 | X | X |
| Comparative Example 6 | 92.1 | 5.0 | X | — | — | — | — | X |

According to the results of Examples 1 and 2, it was found that each crystallization temperature was high, and each crystallization degree was higher than that of any of Comparative Examples. The crystallization steadily advanced in the resin was also confirmed from the calorific value of crystallization. As a result, a resin composition having practically sufficient heat resistance and mechanical strength could be obtained.

In particular, according to Example 2 in which carbodiimide functioning as a hydrolysis suppressor for a poly(lactic acid) was added, even being stored for a long-period of time under high-temperature and high humidity conditions, the resin composition had a high molecular-weight retention, and hence it was found that superior long-term reliability in terms of material properties could be ensured.

In addition, the inventors of the present application found in the past that L-phenylalanine had a nucleating effect to a poly(lactic acid) (see Japanese Unexamined Patent Application Publication No. 2006-299091). However, it was found that the crystallinity of the resin composition of Example 1 was higher than that of the resin composition of Comparative Example 4 in which L-phenylalanine was used as a nucleating agent. The reason for this is that the performance of diketopiperazine functioning as a nucleating agent in which two molecules of L-phenylalanine are dehydration-condensed is superior to that of L-phenylalanine functioning as a nucleating agent.

In addition, according to Comparative Example 5 in which L-phenylalanine was used as a nucleating agent, even though carbodiimide functioning as a hydrolysis suppressor was added, the long-term storage stability was not good under high-temperature and high-humidity conditions. When the nucleating agent is L-phenylalanine, the long-term storage stability can be ensured under high-temperature and high-humidity conditions by further increasing the addition amount of the hydrolysis suppressor. However, when the addition amount of the hydrolysis suppressor is increased, the content of the additive to the poly(lactic acid) is increased, and as a result, the content thereof is decreased; hence, it is not preferable.

As described above, when the substance represented by the general structural formula (1) was contained in the polyester capable of forming a crystal structure, a resin composition could be obtained which can effectively increase the crystallization temperature and which has a high crystallization degree and practically sufficient heat resistance and mechanical strength.

In addition, it was found that by addition of the hydrolysis suppressor to the resin, the long-term reliability of resin properties could be reliably ensured. Accordingly, in particular, when a biodegradable polyester is used as the resin, practically sufficient durability necessary for a finally intended molded product can be easily controlled.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A resin composition comprising:
    a polyester capable of forming a crystal structure; and
    a substance represented by the following general structural formula (1),
    wherein the substance represented by the following general structural formula (1) has a dehydration-condensed structure that is an anhydride of two molecules of natural product-derived α-amino acids or a substitution structure thereof, and the two molecules of α-amino acids are not simultaneously alanine or glycine and at least one amino acid is selected from phenylalanine or valine, General Structural Formula (1)

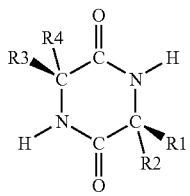

where R1, R2, R3, and R4 indicate groups or substituent groups thereof bonded to the α carbons of the α-amino acids.

2. The resin composition according to claim 1, wherein the polyester is a poly(lactic acid).

3. The resin composition according to claim 2, further comprising a hydrolysis suppressor for the poly(lactic acid).

4. A resin molded product formed from a resin composition which comprises:
    a polyester capable of forming a crystal structure; and
    a substance represented by the following general structural formula (1),
    wherein the substance represented by the following general structural formula (1) has a dehydration-condensed structure that is an anhydride of two molecules of natural product-derived α-amino acids or a substitution structure thereof, and the two molecules of α-amino acid molecules are not simultaneously alanine or glycine and at least one amino acid is selected from phenylalanine or valine, General Structural Formula (1)

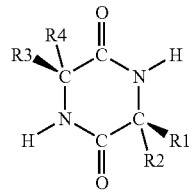

where R1, R2, R3, and R4 indicate groups or substituent groups thereof bonded to the α carbons of the α-amino acids.

5. The resin composition according to claim 1, wherein the substance represented by general structural formula (1) is selected from the group consisting of: Anhydride L-Phenylalanine, Anhydride DL-Phenylalanine, Anhydride D-Phenylalanine, Anhydride L-p-Chlorophenylalanine, Anhydride DL-p-Chlorophenylalanine, Anhydride D-p-Chlorophenylalanine, Cyclo-(Gly-L-Phe), Cyclo-(Gly-D-Phe), Anhydride L-Valine, Anhydride DL-Valine, Anhydride D-Valine.

6. The resin composition according to claim 1, wherein a grain diameter of the substance represented by general structural formula (1) is in the range of 0.001 μm to 10 μm.

7. The resin composition according to claim 1, wherein an amount of the substance represented by general structural formula (1) present in the resin composition is in the range of 0.001 to 10 parts by weight with respect to 100 parts by weight of the polyester capable of forming a crystal structure.

8. The resin composition according to claim 1, further comprising a hydrolysis suppressor.

9. The resin composition according to claim 1, further comprising an inorganic filler.

10. The resin composition according to claim 1, wherein the polyester is biodegradable.

* * * * *